No. 772,663. PATENTED OCT. 18, 1904.
H. MARCH.
WHEEL.
APPLICATION FILED OCT. 6, 1903.
NO MODEL.
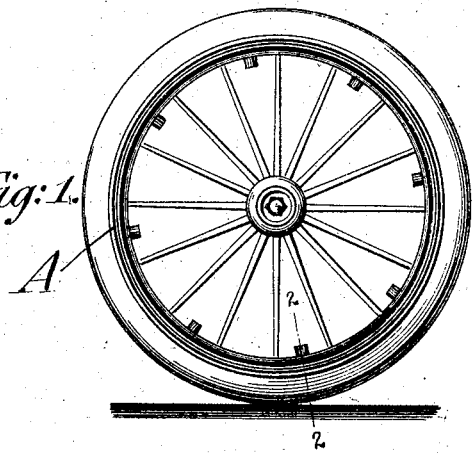
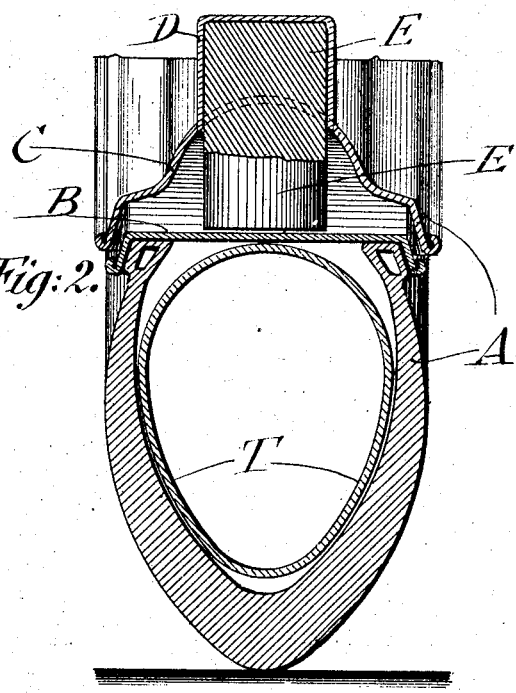
INVENTOR
Henry March
BY
ATTORNEYS No. 772,663. Patented October 18, 1904.

UNITED STATES PATENT OFFICE.

HENRY MARCH, OF LONDON, ENGLAND, ASSIGNOR TO HOBART SEYMOUR GEARY, OF NEW YORK, N. Y.

WHEEL.

SPECIFICATION forming part of Letters Patent No. 772,663, dated October 18, 1904.

Application filed October 6, 1903. Serial No. 175,995. (No model.)

*To all whom it may concern:*

Be it known that I, HENRY MARCH, a subject of the King of Great Britain, residing in London, in the Kingdom of England, have invented certain new and useful Improvements in Wheels for Cycles and other Vehicles, of which the following is a specification.

This invention relates to the construction of the rim portion of the wheels of cycles and other vehicles; and the object of the invention is to construct the rim portion of the wheels in such a manner as to insure the attainment of greater resilience, together with a considerable reduction of the vibration that obtains with the rims of the wheels heretofore in use; and for this purpose the invention consists of a wheel for cycles or other vehicles in which a twin or dual rim is used which is made elastic or resilient by the insertion between the two rims of a series of buffers, which are supported on the inner rim.

The invention consists, further, of a vehicle-wheel the rim of which is made of an inner and an outer rim, of which the inner rim is provided with pockets for the insertion of buffers that render the outer rim elastic or resilient; and the invention consists, further, of certain details of construction, which will be fully described hereinafter and finally pointed out in the claim.

In the accompanying drawings, Figure 1 represents a side view of a wheel for cycles and other vehicles; and Fig. 2 is a vertical transverse section through the same on line 2 2, Fig. 1.

Similar letters of reference indicate corresponding parts.

Referring to the drawings, A represents a pneumatic tire of any approved construction, which is supported on the rim of my improved wheel for cycles and other vehicles. The rim is in the nature of a dual or twin rim—that is to say, it is composed of an inner rim C and an outer rim B. The outer or tire rim is provided with outwardly-flaring flanges at each side, as shown, and the concave inner or buffer rim is provided with corresponding outwardly-flaring flanges incasing the flaring sides of the outer or tire rim. The inner rim C, which is of smaller diameter than the outer rim, is constructed with a series of receptacles or pockets D of any desired or suitable formation or dimensions and arranged, as shown, at diametrically opposite points of the rim, which pockets receive resilient buffers or springs E, which may be of rubber, metal, or any other suitable material as may be found most advantageous in applying my improved rim to practical use. The pockets D are preferably made integral with the inner rim C—that is to say, they are pressed up from the same by suitable dies—so as not to weaken the inner rim, which would be the case if the holes through which the buffers are inserted in the pockets were drilled into the rim. The outer or larger rim B is for the purpose of supporting the tire T, which may be of metal, solid india-rubber, or a cushion or pneumatic tire, as shown in the drawings. The tire rests on the outer rim, which again rests on the buffers or springs of the inner rim, so that when the wheel moves under a load the depression of the outer against the inner rim causes the compression of the buffers or springs, which imparts to the wheel an amount of resilience or elasticity which heretofore has proved unattainable and which, in effect, produces all the advantages of the pneumatic tire without the attendant disadvantages of the latter.

My improved rim for cycles and other vehicle-wheels is specially adapted for vehicles carrying heavy loads, such as motor-vehicles, omnibuses, and other heavy vehicles.

The advantages of the improved springs or buffers are that the resilience is equal, or nearly so, to the pneumatic tire, it can be furnished at about half the cost of the same, is more durable, less liable to the danger of puncture, easily removable, raises a smaller quantity of dust, and obviates the clumsy appearance of the pneumatic tire.

Having thus described my invention, I claim as new and desire to secure by Letters Patent—

A wheel for cycles and other vehicles, provided with a twin rim composed of an outer or tire rim having outwardly-flaring flanges at each side, a concave inner or buffer rim having corresponding outwardly-flaring flanges incasing the flaring sides of the outer or tire rim, a series of solid elastic rubber buffers interposed between the inner and outer rim at points on the inner rim of the wheel diametrically opposite each other adapted to receive and resist pressure from the outer or tire rim, when the vehicle is under load, a series of pockets integral with the inner or buffer rim, closed at their outer ends, which pockets extend and project inwardly from the face of the inner rim having a shape, size and location on the said inner rim approximately corresponding to that of the buffers, and adapted to engage and hold the said buffers in position to coöperate with the outer or tire rim, substantially as set forth.

In testimony that I claim the foregoing as my invention I have signed my name in presence of two subscribing witnesses.

HENRY MARCH.

Witnesses:
H. D. JAMESON,
H. RAND.